(12) United States Patent
Nakano

(10) Patent No.: US 6,174,259 B1
(45) Date of Patent: Jan. 16, 2001

(54) TRUNNION OF TOROIDAL CONTINUOUSLY VARIABLE TRANSMISSION AND MANUFACTURING PROCESS THEREOF

(75) Inventor: Masaki Nakano, Yokohama (JP)

(73) Assignee: Nissan Motor Co., Ltd., Yokohama (JP)

( * ) Notice: Under 35 U.S.C. 154(b), the term of this patent shall be extended for 0 days.

(21) Appl. No.: 09/371,795

(22) Filed: Aug. 10, 1999

(30) Foreign Application Priority Data

Aug. 11, 1998 (JP) .................................................. 10-227074

(51) Int. Cl.[7] .................................................. F16H 15/38
(52) U.S. Cl. .................................................. 476/40
(58) Field of Search ......................................... 476/40, 42

(56) References Cited

U.S. PATENT DOCUMENTS

| 5,820,512 | 10/1998 | Nakano ............................ 476/10 |
| 5,830,103 | * 11/1998 | Itoh et al. ........................ 476/40 |

FOREIGN PATENT DOCUMENTS

| 197 06 287 | 11/1997 | (DE) . |
| 5-39831 | 2/1993 | (JP) . |
| 6-117515 | * 4/1994 | (JP) ..................................... 476/40 |
| 6-280956 | * 10/1994 | (JP) ..................................... 475/40 |
| 8-21504 | 1/1996 | (JP) . |

OTHER PUBLICATIONS

Patent Abstracts of Japan, vol. 017, No. 123 (M–1380), Mar. 15, 1993 & JP 04 307152 (Nissan Motor Co. Ltd).

* cited by examiner

Primary Examiner—Dirk Wright
(74) Attorney, Agent, or Firm—Foley & Lardner

(57) ABSTRACT

A trunnion (3) comprises a support (3C) for supporting a power roller (1), a first shaft part (3A) formed on the top of the support (3C), a second shaft part (3B) formed on the bottom of the support (3C), and a pinhole (33) drilled in a surface (31) of the support (3C). A rod (6) with a pinhole (32) is inserted into the second shaft part (3B), and is joined to the trunnion (3) by pressing a pin (36) into the pinholes (33, 32). A die parting line (3S) when the trunnion (3) is formed, is set to pass outside the surface (31), and the support (3C), the shat part (3A, 3B) and the surface (31) for drilling the pinhole (33) are formed in one piece by die forging.

5 Claims, 6 Drawing Sheets

TRUNNION OF TOROIDAL CONTINUOUSLY VARIABLE TRANSMISSION AND MANUFACTURING PROCESS THEREOF

FIELD OF THE INVENTION

The present invention relates to a trunnion of a toroidal continuously variable transmission for a vehicle and a manufacturing process for the trunnion.

BACKGROUND OF THE INVENTION

Tokkai Hei 5-39831 published in 1993 and Tokkai Hei 8-21504 published in 1996 by the Japanese Patent Office discloses a toroidal continuously variable transmission for a vehicle wherein the ratio of the rotation speed of an input disk relative to the rotation speed of an output disk, i.e., a speed ratio, is continuously varied by varying the gyration angle of a pair of power rollers gripped between the input disk and output disk.

The power rollers are respectively supported by trunnions, and when these trunnions are displaced by hydraulic actuators, the gyration angles of the power rollers change according to the displacement of the trunnions.

SUMMARY OF THE INVENTION

The trunnion and the rod of the actuator are joined by pressing a pin into pinholes respectively formed in the trunnion and rod.

The pinhole in the trunnion is formed by drilling, but to form the pinhole with precision, the surface in which the pin hole is formed must be flattened before drilling It is therefore an object of this invention to allow the pinhole to be precisely formed without machining the surface in which the pinhole is formed.

In order to achieve the above object, this invention provides a trunnion of a toroidal continuously variable transmission, comprising a support having a hole therethrough with an axis, a first shaft part on the top of the support that has an axis perpendicular to the axis of the hole, and a second shaft part on the bottom of the support that is coaxial with the first shaft part. The support has a pinhole adapted for insertion of a pin, an axis of the pinhole being perpendicular to the axis of the first shaft part and being approximately perpendicular to the axis of the hole of the support, and a surface of the support in which the pinhole is pierced is formed as a inclined plane inclining with respect to the axis of the hole.

The details as well as other features and advantages of this invention are set forth in the remainder of the specification and are shown in the accompanying drawings.

DESCRIPTION OF THE PREFERRED EMBODIMENTS

Figure 1:
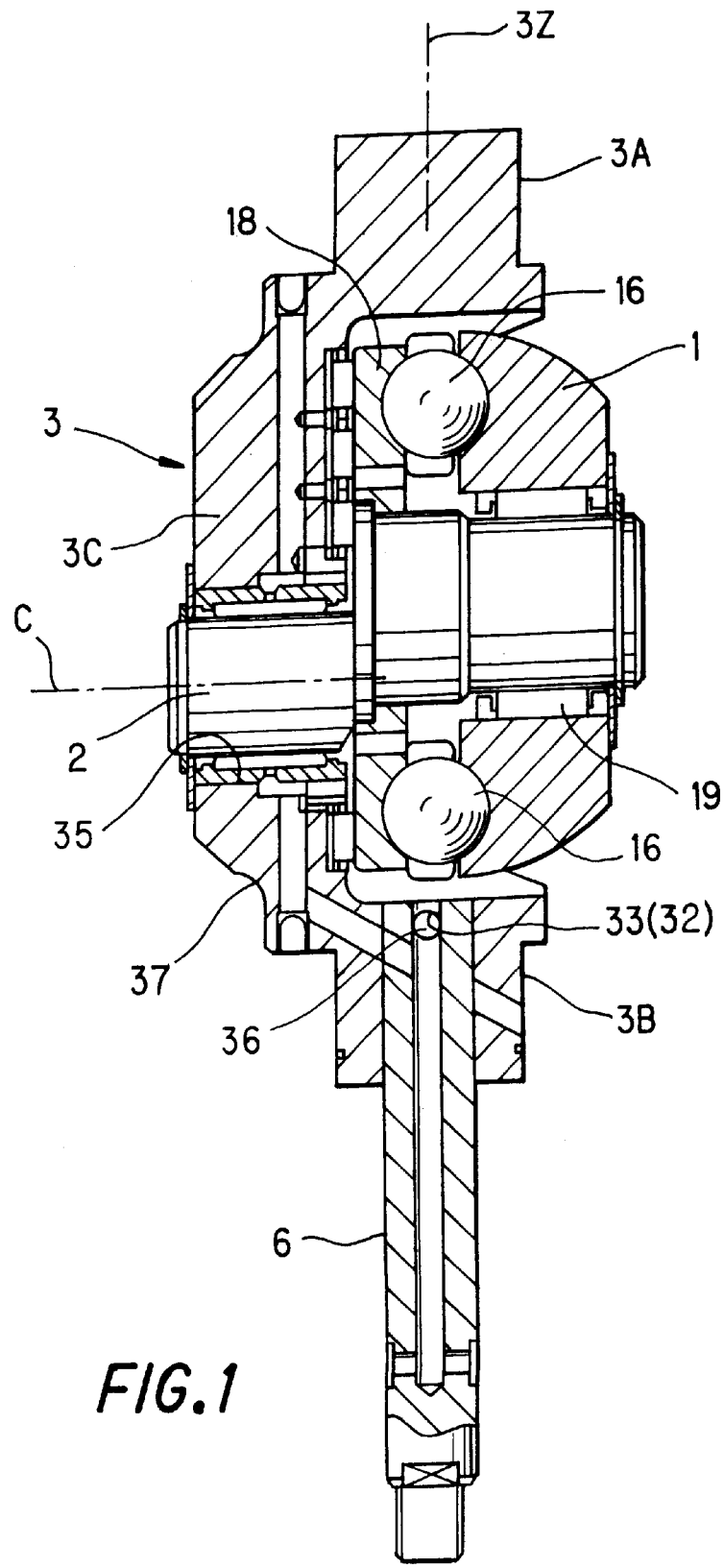
FIG. 1 is a cross-sectional view of a trunnion and a power roller according to this invention.

Referring to FIG. 1 of the drawings, a trunnion 3 comprises a support 3C which supports a power roller 1 such that it is free to rotate, and shaft parts 3A, 3B formed on the top and bottom of the support 3C. The support 3C and shaft parts 3A, 3B are formed in one piece by die forging.

A through-hole 35 is formed in the support 3C. One end of a pivot shaft 2 is inserted in the through-hole 35, and is supported such that it is free to pivot around an axis C. The power roller 1 is supported at the other end of the pivot shaft 2 via a radial bearing 19. An outer ring 18 and ball ring 16 are interposed between the support 3C and power roller 1, and support a thrust load.

When the trunnion 3 displaces in the direction of an rotation axis 3Z, the power roller 1 gyrates between an input disk and output disk, not shown, and the ratio of the rotation speed of the input disk to the rotation speed of the output disk i.e., the speed ratio, varies continuous.

Figure 2:
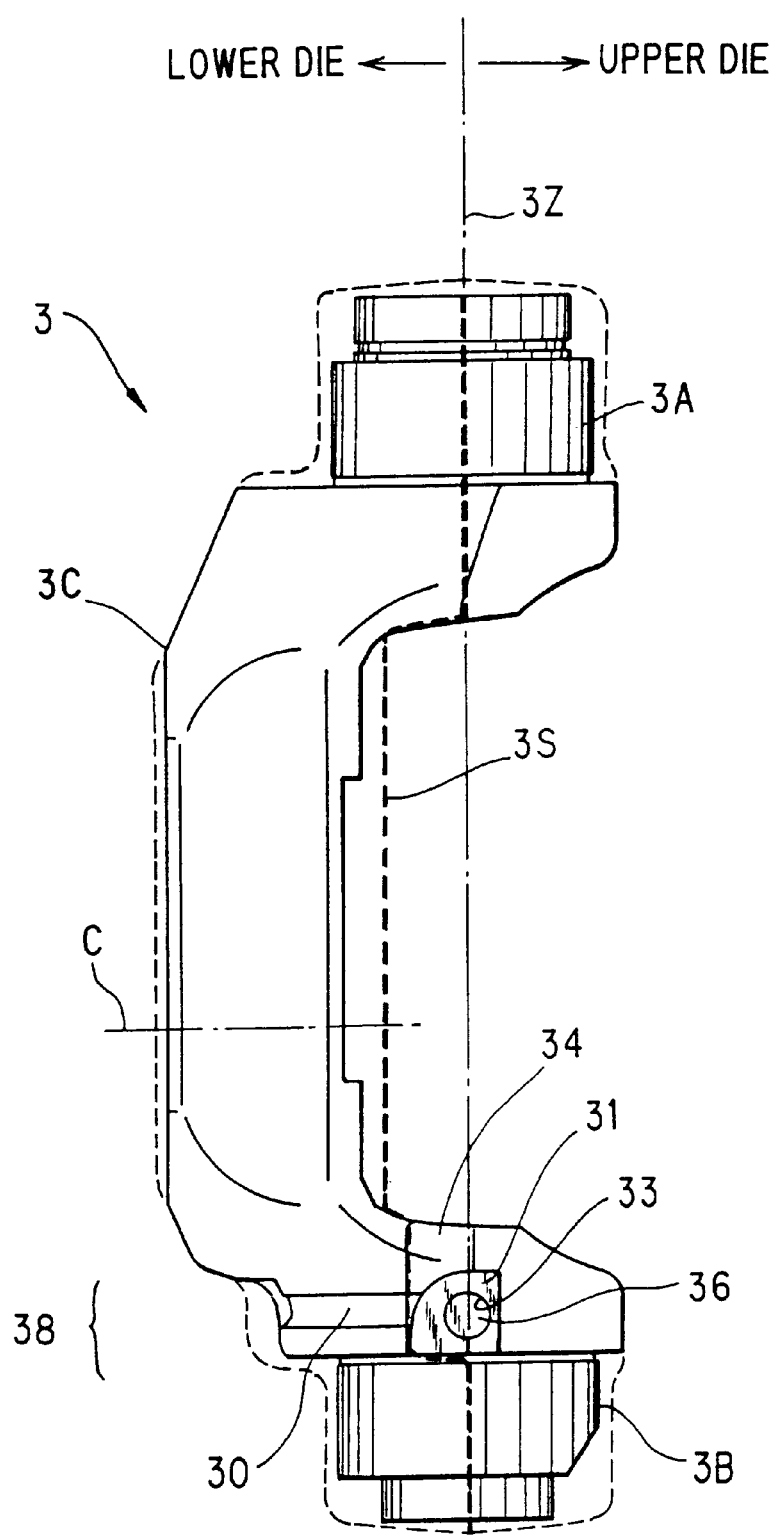
FIG. 2 is a front view of the trunnion.
Figure 4:
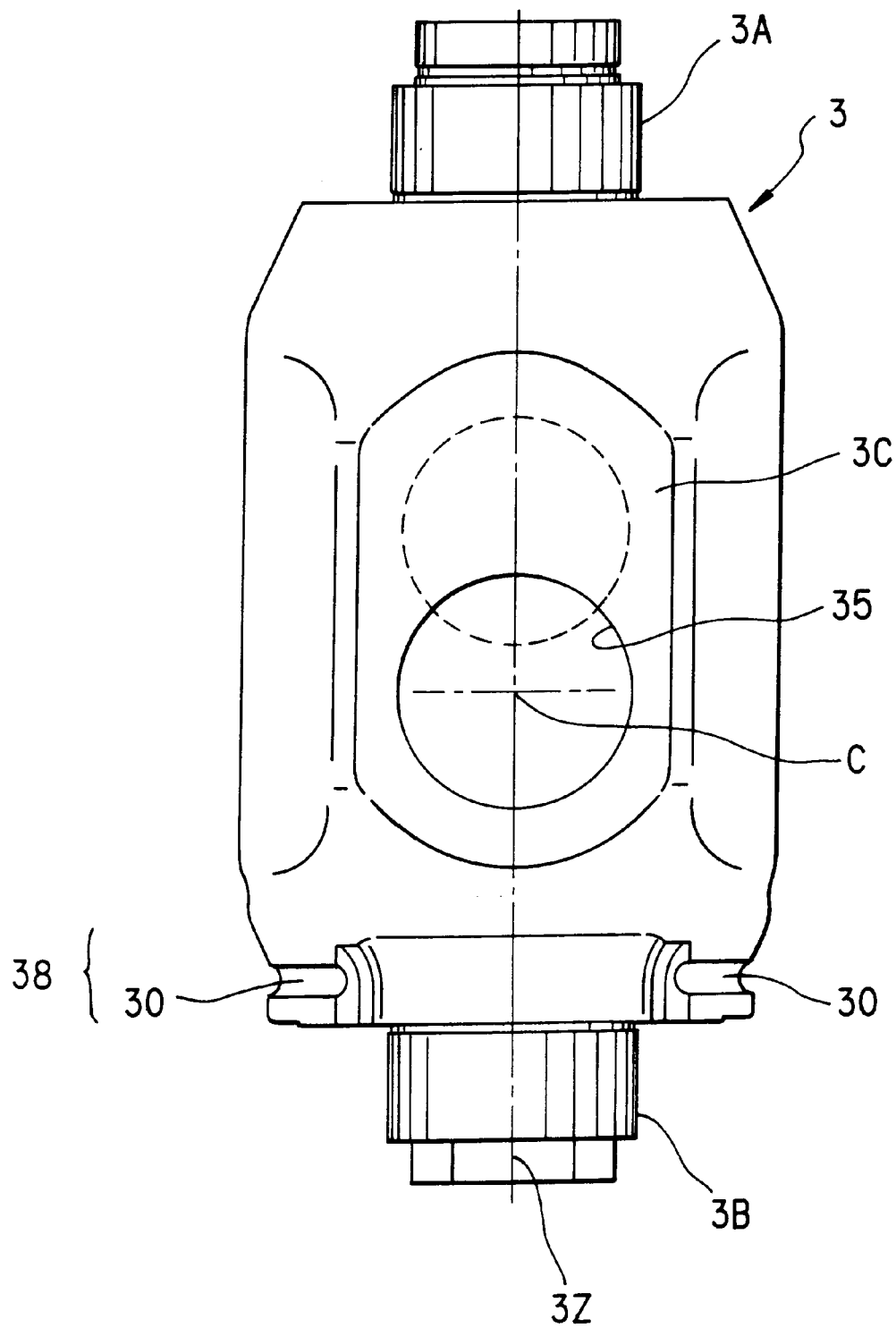
FIG. 4 is a side view of the trunnion.

A pulley 38 having a pulley grove 30 is formed in the lower part of the support 3C, as shown in FIG. 2 and FIG. 4. An endless wire, not shown, is looped around the pulley groove 30. The gyration angle of the trunnion 3 and the gyration angle of another trunnion facing it can be synchronized by this endless wire.

The shaft part 3B is formed in a cylindrical shape. A rod 6 of a hydraulic actuator, not shown, is inserted into the shaft part 3B. The rod 6 and trunnion 3 are joined by pressing a pin 36 in a pinhole 33 formed in the support 3C and a pinhole 32 formed in the rod 6.

Figure 3:
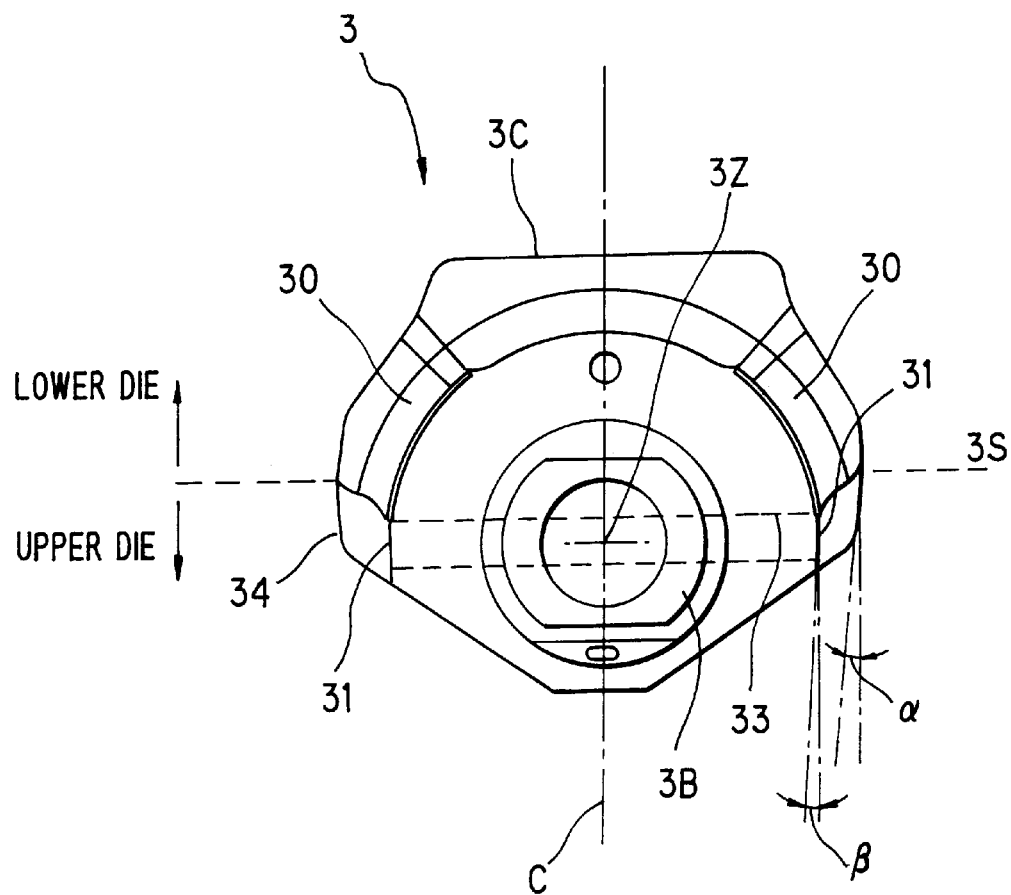
FIG. 3 is a base plan view of the trunnion.

As shown in FIG. 3, the pinhole 33 is formed so that it passes through the rotation axis 3Z of the trunnion 3, and is perpendicular to the axis C of the pivot shaft 2. A surface 31 for drilling the pinhole 33 is formed during forging in the lower part of the support 3C.

As shown in FIG. 2, a die parting line 3S of the trunnion 3 is set as shown by the thick broken line in the figure, i.e., effectively centered on the rotation axis 3Z, excepting for the center of the support 3C. The part on the left side of the die parting be 3S is formed by a lower die, and the part on the right side of the die parting line 3S is formed by an upper die. The thin broken line in the figure shows the shape of the material.

In the upper part of the support 3C and in the shaft parts 3A, 3B, the die parting line 3S passes through the rotation axis 3Z and is set on a plane perpendicular to the axis C of the pivot shaft 2. From the center to the lower part of the support 3C, the die parting line 3S is set further to the left than the rotation axis 3Z. In particular, in the lower part of the support 3C, the die parting line 3S is set between the pulley groove 30 and the surface 31 for drilling the pinhole 33.

Therefore, as the die parting line 3S does not pass over the surface 31, there is no formation of burrs on the surface 31 due to forgoing and deburring of the surface 31 after forging is unnecessary.

The draft angle in the vicinity of the surface 31 is set as shown in FIG. 3. On the side face 34 of the support 3C above the surface 31, the draft angle is set to $\alpha$. $\alpha$ is set to, for example, 5 degree. On the other hand, the draft angle of the surface 31 is set to $\beta$ which is less than $\alpha$. $\beta$ is set to a value at which the drill tip does not slip, for example, 3 degrees.

Therefore, as the draft angle of the surface 31 which is formed in one piece during forging is set to a small value $\beta$ at which drilling is possible, the drill tip does not slip during drilling.

Figure 5:
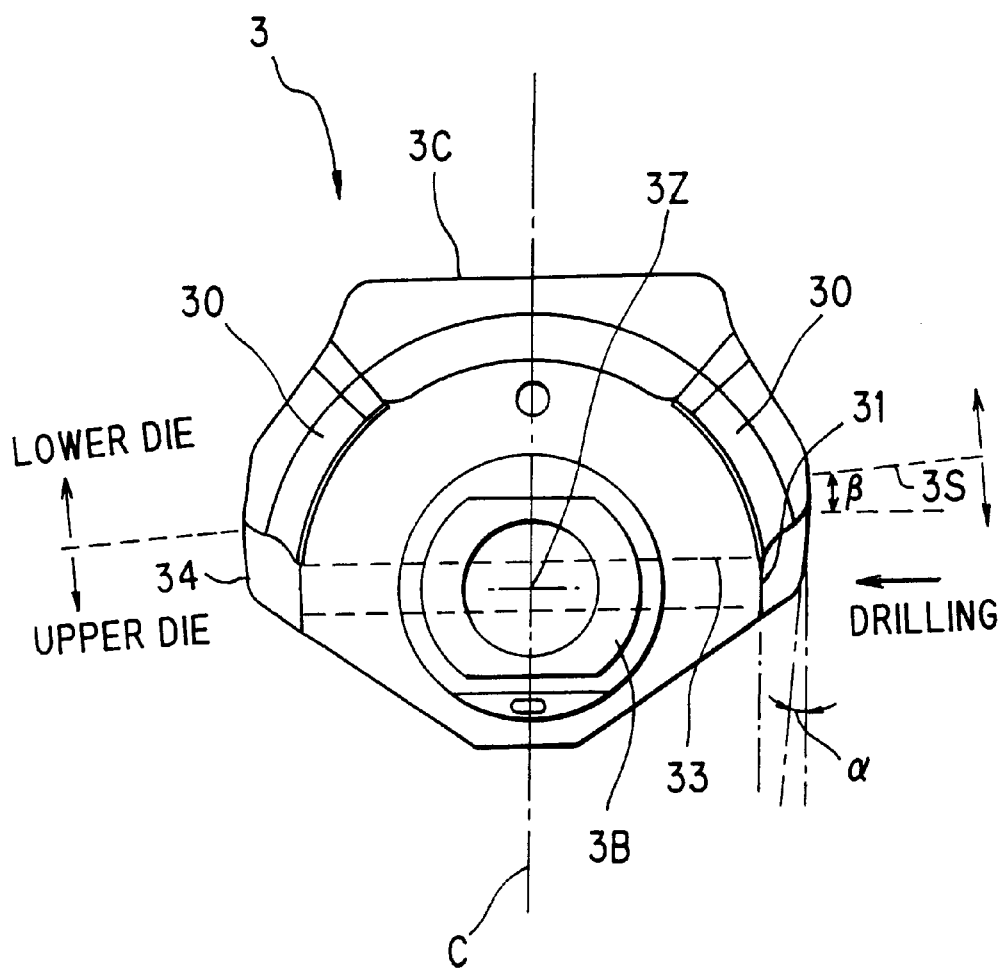
FIG. 5 is similar to FIG. 3, but showing a second embodiment of the invention.

FIG. 5 shows a second embodiment of this invention.

This embodiment differs from the first embodiment in that the die paring lie 3S is inclined at the same angle as the draft angle β of the surface 31 of the first embodiment, and the surface 31 which is drilled is set perpendicular to the pinhole 33. The remaining features of the construction are the same as those of the first embodiment In this case also, the die parting line 3S does not pass over the surface 31, so deburring of the surface 31 is unnecessary. Also, as the surface 31 is perpendicular to the pinhole 33, the pinhole 33 can be machined accurately without the drill tip slipping.

Figure 6:
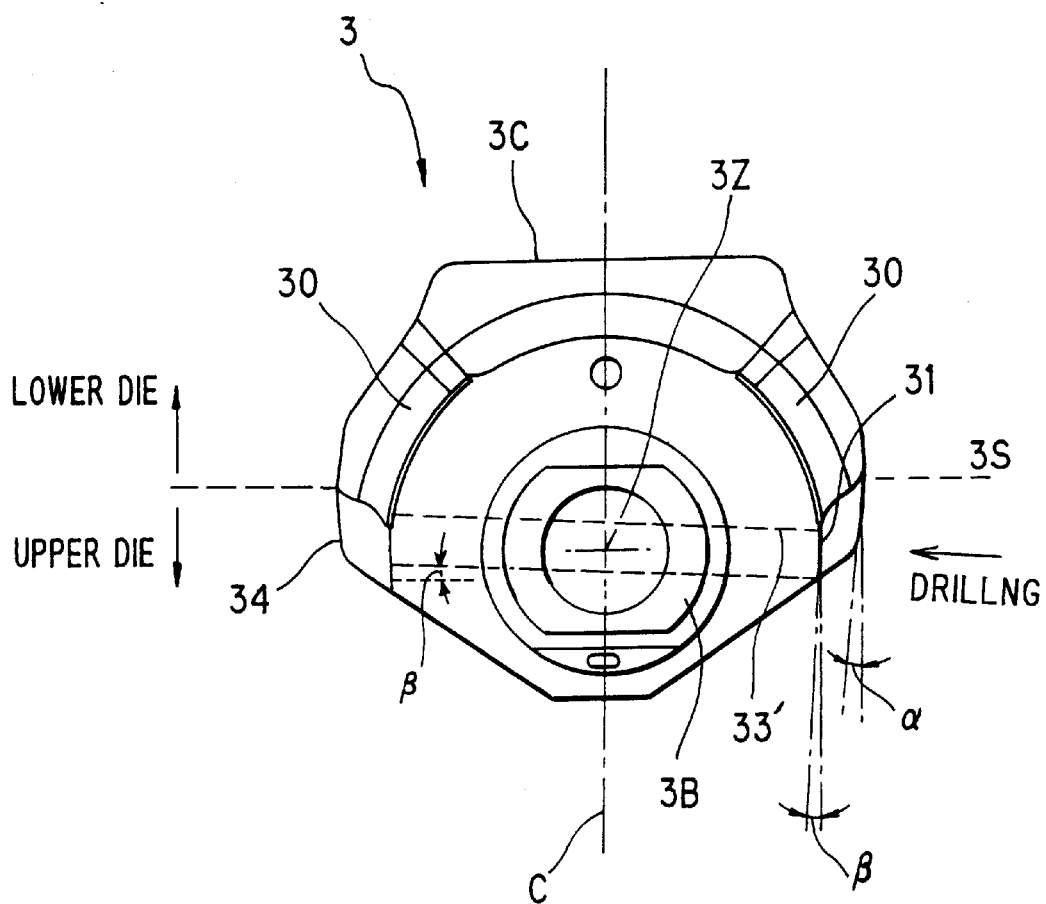
FIG. 6 is similar to FIG. 3, but showing a third embodiment of the invention.

FIG. 6 shows a third embodiment of this invention.

This embodiment differs from the fist embodiment in that drilling is performed from the perpendicular direction to the surface 31, and the pinhole 33 is inclined at the same angle as the draft angle β of the surface 31. The remaining features of the construction are the same as those of the first embodiment In his case, the die parting line 3S does not pass through the surface 31, so deburring of the surface 31 prior to drilling is unnecessary. Also, as drilling is performed from a perpendicular direction to the surface 31, the pinhole 33 can be machined accurately without the drill tip slipping.

According to the above embodiments, the trunnion is formed by die forgoing, but the trunnion may also be molded by die casting or casting. In this case also, the die parting line (or mold parting line) is set as shown by the thick broken line in FIG. 2.

The entire contents of Japanese Patent Application P10-227074 (filed Aug. 11, 1998) are incorporated herein by reference.

Although the invention has been described above by reference to a certain embodiment of the invention, the invention is not limited to the embodiment described above. Modifications and variations of the embodiments described above will occur to those skilled in the art, in light of the above teachings. The scope of the invention is defined with reference to the following claims.

What is claimed:

1. A trunnion of a toroidal continuously variable transmission, comprising:

a support having a hole therethrough with an axis;

a first shaft part on the top of said support that has an axis perpendicular to said axis of said hole; and a second shaft part on the bottom of said support that is coaxial with said first shaft part;

wherein said support has a pinhole adapted for insertion of a pin, an axis of said pinhole being perpendicular to said axis of said first shaft part and being approximately perpendicular to said axis of said hole of said support, and a surface of said support in which said pinhole is pierced is formed as a inclined plane inclining with respect to said axis of said hole.

2. A trunnion of a toroidal continuously variable transmission as defined in claim 1, wherein said support is shaped off said axis of said first shaft part, and said surface is inclining so that said surface approaches said axis of said hole of said support as the distance from said support increase.

3. A trunnion of a toroidal continuously variable transmission as defined in claim 2, wherein said surface is inclining to said axis of said hole of said support at less than 5 degrees.

4. A manufacturing process for a trunnion of a toroidal continuously variable transmission including:

a support having a hole therethrough with an axis;

a first shaft part on the top of said support that has an axis perpendicular to said axis of said hole; and a second shaft part on the bottom of said support that is coaxial with said first shaft part;

wherein said support has a pinhole adapted for insertion of a pin, an axis of said pinhole being perpendicular to said axis of said first shaft part and being approximately perpendicular to said axis of said hole of said support, and a surface of said support in which said pinhole is pierced is formed as a inclined plane inclining with respect to said axis of said hole;

said process comprising:

shaping said support, said first shaft part and said second shaft part in one piece by using a die forming said surface as a plane; and drilling said pinhole in said support staring from said surface.

5. A manufacturing process for a trunnion of a toroidal continuously variable transmission as defined in claim 4, wherein said die is divided into plural parts by a die paring line which passes off said surface toward said support.

* * * * *